US012735134B2

(12) United States Patent
Avallone et al.

(10) Patent No.: US 12,735,134 B2
(45) Date of Patent: Sep. 15, 2026

(54) WINDSHIELD FOR A VEHICLE

(71) Applicant: Harley-Davidson Motor Company, Inc., Milwaukee, WI (US)

(72) Inventors: Anthony Avallone, Wauwatosa, WI (US); Daniel Schneider, Franklin, WI (US); Aaron Brechbill, Waukesha, WI (US); Jonathon M. Tyznik, Hubertus, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 251 days.

(21) Appl. No.: 18/758,578

(22) Filed: Jun. 28, 2024

(65) Prior Publication Data

US 2024/0359760 A1 Oct. 31, 2024

Related U.S. Application Data

(63) Continuation of application No. 18/139,218, filed on Apr. 25, 2023, now Pat. No. 12,428,087.

(51) Int. Cl.

*B62J 17/04* (2006.01)
*B60J 1/00* (2006.01)
*B60J 1/02* (2006.01)
*B62J 17/10* (2020.01)

(52) U.S. Cl.

CPC ............... *B62J 17/04* (2013.01); *B60J 1/006* (2013.01); *B60J 1/008* (2013.01); *B60J 1/02* (2013.01); *B62J 17/10* (2020.02)

(58) Field of Classification Search

CPC ... B60J 17/04; B60J 17/10; B60J 17/02; B60J 17/08; B60J 17/086; B60J 1/006; B60J 1/008; B60J 1/02

USPC ....... 296/84.1, 91, 96.21, 181.5, 201, 180.1; D12/114

See application file for complete search history.

(56) References Cited

U.S. PATENT DOCUMENTS 3,819,226 A 6/1974 Sykora
3,993,347 A 11/1976 Bombardier
4,027,914 A 6/1977 Yamamoto et al.
(Continued)

FOREIGN PATENT DOCUMENTS

EP 3150471 B1 9/2019
WO 2019229669 A1 12/2019

OTHER PUBLICATIONS

Harley Davidson, "FLHR Windshield Kits," instructions dated Apr. 28, 2022 (6 pages).

*Primary Examiner* — Roger L Pang
(74) *Attorney, Agent, or Firm* — Michael Best & Friedrich LLP

(57) ABSTRACT

A windshield including a first side edge, a second side edge, a front edge, and a rear edge. A central portion of the front edge is raised relative to the first side edge and the second side edge. A notch extends from the front edge towards the rear edge and has an open end at the front edge and a closed end spaced apart from the open end. A mounting hole is closer to the first side edge than the second side edge, and a second mounting hole is closer to the second side edge than the first side edge. The front edge is configured to conform to a contour of a panel, the notch is configured to engage with a bracket that extends from the panel, and each of the first and second mounting holes is configured to receive a fastener to secure the windshield to the panel.

32 Claims, 14 Drawing Sheets

(56) References Cited

U.S. PATENT DOCUMENTS

| | | | | |
|---|---|---|---|---|
| 4,087,110 | A | | 5/1978 | Vetter et al. |
| 4,166,650 | A | | 9/1979 | Saunders, IV |
| 4,416,465 | A | | 11/1983 | Winiecki |
| D295,277 | S | * | 4/1988 | Preisler ........................ D12/182 |
| 7,032,915 | B2 | | 4/2006 | Bedard et al. |
| 7,805,799 | B2 | | 10/2010 | Reid et al. |
| 7,823,246 | B2 | | 11/2010 | Reid et al. |
| 7,828,359 | B2 | | 11/2010 | Caprio |
| 9,381,947 | B2 | | 7/2016 | Serizawa et al. |
| 9,796,442 | B1 | | 10/2017 | Kalmus |
| 10,232,901 | B1 | | 3/2019 | Kalmus |
| 10,272,966 | B2 | | 4/2019 | Maffe |
| 11,358,667 | B2 | | 6/2022 | Maffe et al. |
| 2009/0195011 | A1 | | 8/2009 | Tsuda et al. |
| 2013/0249239 | A1 | | 9/2013 | Yokouchi et al. |
| 2016/0090144 | A1 | | 3/2016 | Shimizu et al. |
| 2016/0244117 | A1 | | 8/2016 | Tanabe et al. |
| 2017/0267304 | A1 | | 9/2017 | Nakano et al. |
| 2019/0061858 | A1 | * | 2/2019 | Goodrick ................. B62J 17/04 |
| 2022/0055709 | A1 | * | 2/2022 | Tamura .................. B62J 50/225 |
| 2024/0101212 | A1 | | 3/2024 | Kizu |

* cited by examiner

WINDSHIELD FOR A VEHICLE

CROSS-REFERENCE TO RELATED APPLICATIONS

This application is a continuation application of co-pending U.S. patent application Ser. No. 18/139,218, filed on Apr. 25, 2023, the entire contents of which are incorporated by reference herein.

FIELD OF THE INVENTION

The present invention relates to a windshield for a vehicle.

BACKGROUND OF THE INVENTION

A motorcycle rider encounters traveling wind when riding a motorcycle. Motorcycles therefore often have a windshield, a duct, or both to prevent and/or redirect air from reaching the rider.

SUMMARY OF THE INVENTION

In one aspect, the invention provides a vehicle including a frame and a panel coupled to the frame. The panel includes an open-ended aperture extending therethrough. The vehicle further includes a duct including a bore that is aligned with a portion of the aperture, a windshield fixedly coupled to the duct, and a fastener that clamps the duct to the panel. The fastener extends through the aperture in the panel and into the bore in the duct. Under a predetermined deceleration of the vehicle, the fastener moves through the aperture such that the duct and the windshield release from the panel.

In another aspect, the invention provides a windshield and duct assembly removably coupled to a panel of the vehicle. The windshield and duct assembly includes a duct including a bore, a windshield coupled to the duct, a plurality of fasteners that fixedly couple the windshield to the duct, a plurality of fasteners that are configured to clamp the duct to the panel such that the duct, the windshield, and the plurality of fasteners that are selectively removable from the panel in a forward direction without the fasteners breaking or otherwise deforming.

In yet another aspect, the invention provides a method of assembling a vehicle including providing a panel with an open-ended aperture and providing a windshield and duct assembly. The windshield and duct assembly includes a duct including a bore, a windshield coupled to the duct, and a fastener. The method further includes clamping, via the fastener, the duct to the panel such that under a predetermined deceleration of the vehicle, the windshield and duct assembly is restrained relative to the panel only by friction in the forward direction.

In some aspects, the techniques described herein relate to a windshield removably couplable to a panel of a vehicle, the windshield including: an outer surface; an inner surface opposite the outer surface; a first side edge; a second side edge; a front edge extending between the first side edge and the second side edge, a central portion of the front edge being raised relative to the first side edge and the second side edge; a rear edge extending between the first side edge and the second side edge; a notch extending from the front edge towards the rear edge, the notch having an open end at the front edge and a closed end spaced apart from the open end; a first mounting hole closer to the first side edge than the second side edge; and a second mounting hole closer to the second side edge than the first side edge, wherein the front edge is configured to conform to a contour of the panel, wherein the notch is configured to engage with a bracket that extends from the panel, and wherein each of the first mounting hole and second mounting hole is configured to receive a fastener to secure the windshield to the panel.

In some aspects, the techniques described herein relate to a windshield removably couplable to a panel of a vehicle, the windshield including: an outer surface; an inner surface opposite the outer surface; a front edge having a central portion, a first side portion extending from the central portion at an obtuse angle, and a second side portion extending from the central portion at an obtuse angle; a rear edge opposite the front edge; a first side edge extending between the front edge and the rear edge; a second side edge between the front edge and the rear edge; a notch extending from the front edge towards the rear edge, the notch having an open end at the front edge and a closed end spaced apart from the open end; a first mounting hole closer to the first side edge than the second side edge; and a second mounting hole closer to the second side edge than the first side edge, wherein the notch is configured to engage with a bracket that extends from the panel, and wherein each of the first mounting hole and second mounting hole is configured to receive a fastener to secure the windshield to the panel.

In some aspects, the techniques described herein relate to a windshield removably couplable to a panel of a vehicle, the windshield including: an outer surface; an inner surface opposite the outer surface; a front edge; a rear edge opposite the front edge; a first side edge extending between the front edge and the rear edge; a second side edge extending between the front edge and the rear edge; a first notch extending from the front edge towards the rear edge, the first notch having an open end at the front edge and a closed end spaced apart from the open end; a second notch extending from the front edge towards the rear edge, the second notch having an open end at the front edge and a closed end spaced apart from the open end; a first mounting hole closer to the first side edge than the second side edge; a second mounting hole closer to the first side edge than the second side edge, the first mounting hole and the second mounting hole aligned along a first axis extending between the front edge and the rear edge, the first axis being positioned at a non-parallel angle relative to the first side edge; a third mounting hole closer to the second side edge than the first side edge; and a fourth mounting hole closer to the second side edge than the first side edge, the third mounting hole and the fourth mounting hole aligned along a second axis extending between the front edge and the rear edge, the second axis being positioned at a non-parallel angle relative to the second side edge, wherein the first notch is configured to engage with a first bracket that extends from the panel, and the second notch is configured to engage with a recess of a second bracket that extends from the panel, wherein each of the first mounting hole, the second mounting hole, the third mounting hole, and the fourth mounting hole is configured to receive a fastener to secure the windshield to the panel.

DETAILED DESCRIPTION

Figure 1:
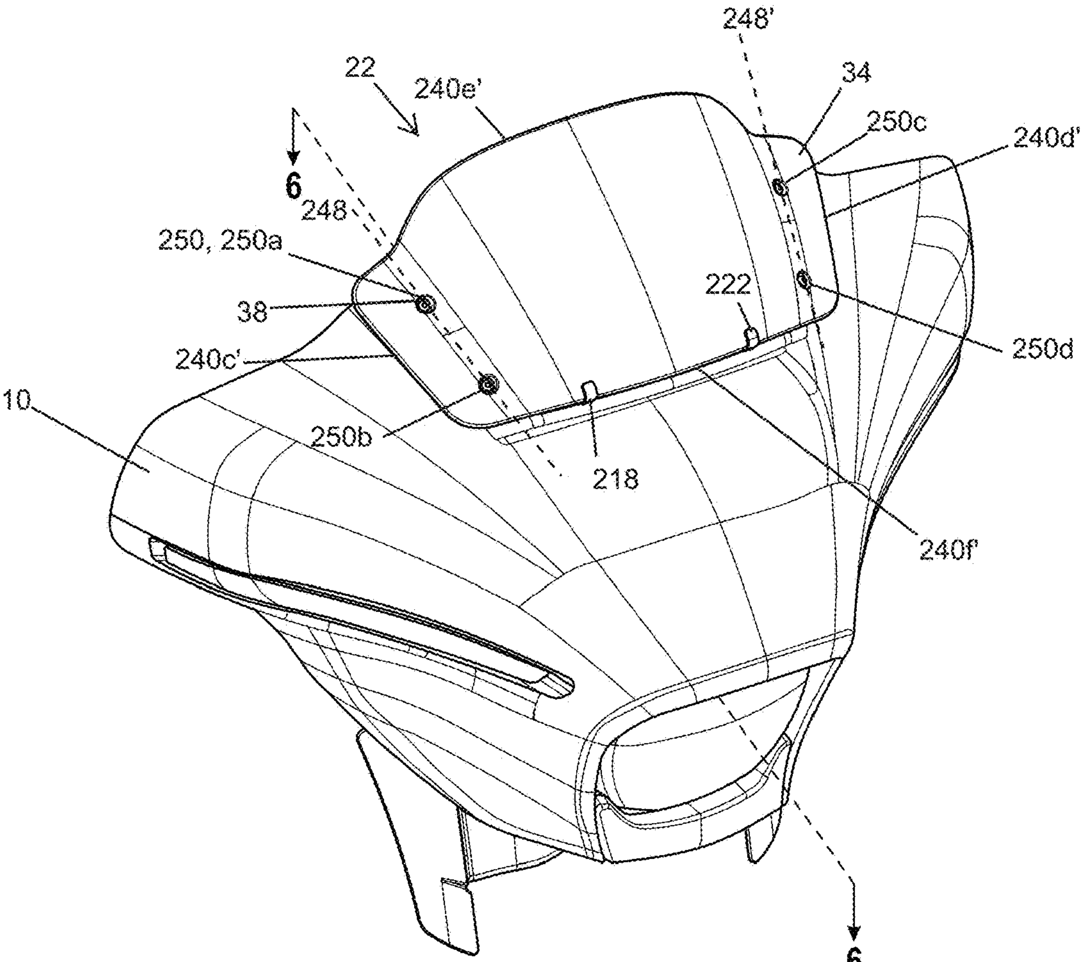
FIG. 1 is a perspective view of an outer fairing for a vehicle including a windshield and duct assembly according to another embodiment.
Figure 2:
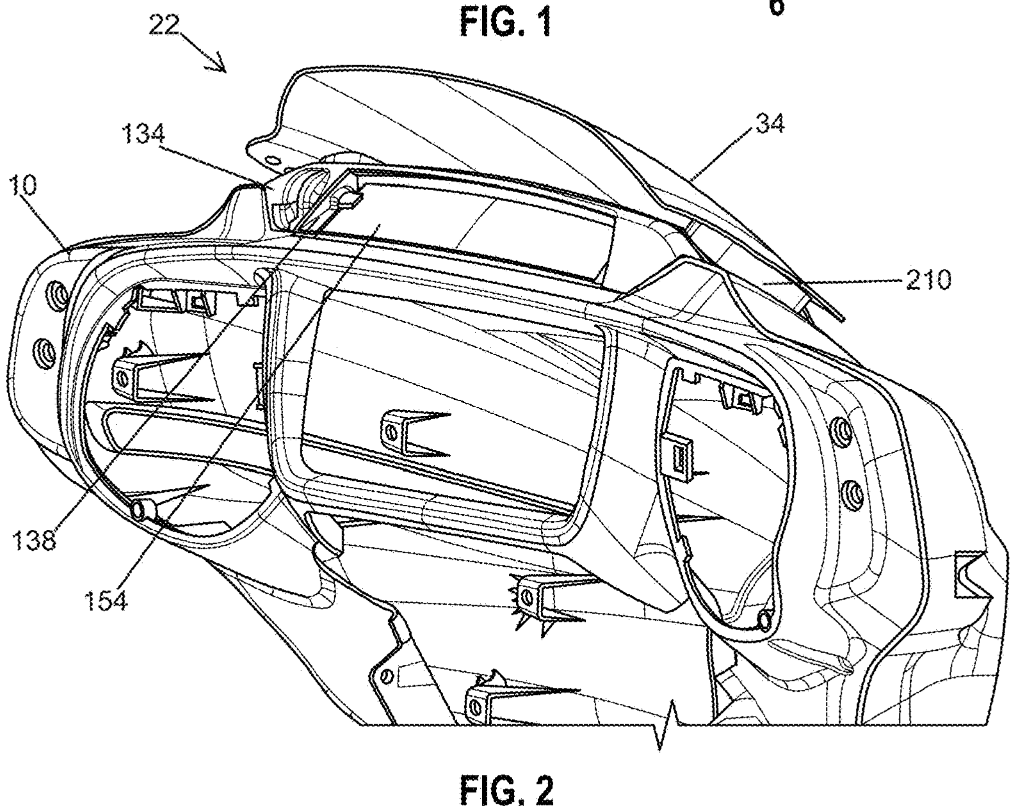
FIG. 2 is another a perspective view of the outer fairing and the windshield and duct assembly of FIG. 1.

Before any embodiments of the invention are explained detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-8 and 9-14 illustrate an outer fairing 10 (e.g., an outer panel) configured to be coupled a frame of a vehicle and a windshield and duct assembly 22 that is removably coupled to the outer fairing 10. The windshield and duct assembly 22 includes a duct 26, a duct cover 30, and a windshield 34 that are fixedly coupled to one another via a first plurality of fasteners 38. The individual components can have a variety of different shapes—the illustrated embodiments of FIGS. 1-8 and 9-14 being just two representative examples. In particular, the windshield 34 can have a variety of different shapes and particularly different heights that project up above the outer fairing 10. The windshield and duct assembly 22 further includes a second plurality of fasteners 42 that removably clamp the windshield and duct assembly 22 to the outer fairing 10. As will be discussed in greater detail below, the fasteners 42 clamp the duct 26 to the outer fairing 10 such that during normal use, the windshield and duct assembly 22 is coupled to the outer fairing 10, but in response to the vehicle experiencing deceleration that is equal to or greater than a predetermined deceleration (e.g., such as brought about by a collision), the windshield and duct assembly 22 can release from (e.g., move or slide off) the outer fairing 10. The predetermined deceleration is greater than deceleration attributed to normal operating conditions of the vehicle, such as when being driven, when undergoing maximum breaking, being towed by trailer, when experiencing inclement (e.g., windy) weather conditions, or any combination of these. That is, the windshield and duct assembly 22 can release from the outer fairing 10 via inertia. Because the windshield and duct assembly 22 is configured to release from the outer fairing 10 it can move out from in front of the rider with or without contact of the rider. In other words, the windshield and duct assembly 22 functions as a break-away component that can move out from in front of the rider with or without contact of the rider.

The outer fairing 10 and the windshield and duct assembly 22 of each of FIGS. 1-8 and 9-14 are similar with respect to their connection structures and therefore like structure will be identified by like reference numerals.

As shown in FIGS. 3, 7, 10, and 13, the outer fairing 10 includes a body that has an outer surface, an inner surface opposite the outer surface, a first side, a second side, a front end, and a rear end. A first projection 50 extends from the outer surface and a second projection 54 extends from the outer surface. The second projection 54 is spaced apart from the first projection 50 by a gap 58. A plurality of open-ended apertures 62 extend through the body from the outer surface to the inner surface. In the illustrated embodiment there are four open-ended apertures 62. Two of the open-ended apertures 62 are positioned between the first side and the first projection 50, and two of the open-ended apertures 62 are positioned between the second side and the second projection 54. Accordingly, the open-ended apertures 62 are outside of the gap 58 between the first projection 50 and the second projection 54.

Further with respect to FIGS. 6, 7, 13, and 14, the open-ended apertures 62 each include a closed end 66 and an open end 70 opposite the closed end 66. Moreover, an axis A is defined between the closed end 66 and the open end 70. The closed end 66 is positioned closer to the rear end of the outer fairing 10 and the open end 70 is positioned closer to the front end of the outer fairing 10. A first portion 74 extends from the closed end 66 towards the open end 70 and a second portion 78 extends from the first portion to the open end 70. In the illustrated embodiments, the first portion 74 has a width that is less than a width of the second portion 78.

The duct 26 is removably coupled to the outer fairing 10. The duct 26 includes a body that has an outer surface, an inner surface, a first side, a second side, a rear end, and a front end. A front lip or edge 100 extends from the outer surface along the front end. The body includes a first side portion, a second side portion, and a central portion. The first side portion extends from the first side to the central portion and the second side portion extends from the second side to the central portion. Each of the first side portion and the second side portion includes a first set of bores 104 that face in a first direction (e.g., generally downwardly) and a second set of bores 108 that face in a second direction (e.g., generally upwardly). Each of the first set of bores 104 defines an axis B. Each of the bores 104 is configured to align with the first portion 74 of one of the open-ended apertures 62 of the outer fairing 10. As shown, the axis B of each of the bores 104 is transverse to the axis A of the respective open-ended aperture 62.

The fasteners 42 removably couple or clamp the duct 26 (and therefore duct vane assembly 130, the duct cover 30, and the windshield 34) to the outer fairing 10 such that the duct 26 is restrained relative to the panel only by friction in the forward direction. In particular, each of the fasteners 42 includes a head 112 and a threaded portion 116. The head 112 abuts the inner surface of the outer fairing 10 while the threaded portion 116 extends through the respective open-ended aperture 62 of the outer fairing 10 and the respective bore 104 of the duct 26. That is, the threaded portion 116 of each fastener 42 is generally aligned with the axis B of the respective bore 104. Moreover, to ensure that the windshield and duct assembly 22 is retained during normal use but may be released when the vehicle 18 experiences the predetermined deceleration (discussed in greater detail below), in some embodiments, each fastener 42 applies a clamp load between the outer fairing 10 and the duct 26 of greater than 328 pound-force. In some embodiments, each fastener 42 applies a clamp load between the outer fairing 10 and the duct 26 of approximately 438 pound-force to approximately 952 pound-force. The term approximately as used herein means plus or minus 25% of the stated value. The fasteners 42 can be self-tapping screws, which help to ensure the appropriate clamp loads. Additionally, each one of the fasteners 42 is coupled to the respective bore 104 with 23 inch-pound to 30 inch-pound of torque.

The duct 26 further includes a duct vane assembly 130 that is removably coupled to the body. As shown, in FIGS. 3, 5, 10, and 12, the duct vane assembly 130 includes a body or bezel 134 that has an outer surface and an inner surface opposite the inner surface, a first side, and a second side opposite the first side. The outer surface defines a recess 138. A first projection 142 is positioned on the first side and extends from the inner surface and a second projection 146 is positioned on the second side extends from the inner surface. The bezel 134 movably supports (via an actuator 150) a vane 154 that extends across the recess 138 in the outer surface. Each of the first and second projections 142, 146 includes a clip 158, 162 that is removably coupled (e.g., by a snap fit or a friction fit) thereto. Each of the projections 142, 146, with the clip 158, 162, is received within a respective aperture 166, 170 in the rear end of the body of duct 26. The clips 158, 162 removably couple the bezel 134 (and the bezel vane assembly 130) to the duct 26.

When assembled, the first side portion of the duct 26 is positioned generally between the first side of the outer fairing 10 and the first projection 50, the second side portion of the duct 26 is positioned generally between the second side of the outer fairing 10 and the second projection 54, and the central portion overlies the gap 58 between the first projection 50 and the second projection 54. A channel is defined between an inner surface of the central portion of the duct 26 and the outer surface of the outer fairing 10 in the area created by the gap 58. The bezel 134 is coupled to the rear end of the duct 26. Specifically, the projections 142, 146 and clips 158, 162 are received by the respective apertures 166, 170 of the duct 26. The recess 138 of the bezel 134 is aligned with and at least partially defines the channel. The vane 154 of the duct vane assembly 130 is positioned to extend across the channel and is movable relative to the channel via the actuator 150. Also, a portion of the bezel 134 defines a rear lip or edge 184 that, when assembled, is adjacent to a rear end of the duct 26. A recess 188 is defined between the rear lip 184 created by the bezel 134 and the front lip 100 of the duct 26.

The duct cover 30 is fixedly coupled to the body of the duct 26. The duct cover 30 includes a body that has an outer surface, an inner surface, a first side, a second side, a rear end, and a front end. The body includes a first side portion, a second side portion, and a central portion. The first side portion extends from the first side to the central portion and the second side portion extends from the second side to the central portion. The duct cover 30 includes a first coupler 210 extends from the outer surface of the first side portion and a second coupler 214 that extends from the outer surface of the second side portion. The duct cover 30 further includes a first bracket 218 and a second bracket 222 that extend from the outer surface and that are positioned adjacent to the front end thereof. Each of the brackets 218, 222 includes a recess 226, 230. The body of the duct cover 30 is coupled to the duct 26 and is generally positioned within the recess 188. As shown, the outer surface of the duct cover 30 is flush with the outer surface of the rear lip 184 defined by the bezel 134 and the outer surface of the front lip 100 of the duct 26. Some of the fasteners 38 (only one of which is shown) extend through a first set of apertures 234 in each of the couplers 210, 214 and into a respective bore 108 of the second set of bores 108 to fixedly couple the duct cover 30 to the duct 26. Accordingly, the first side portion of the duct cover 30 is adjacent to the first side portion of the duct 26, the second side portion of the duct cover 30 is adjacent to the first side portion of the duct 26, and the central portion of the duct cover 30 is adjacent to the central portion of the duct 26. Although the duct 26 and duct cover 30 are separate components that are coupled to one another in the illustrated embodiments, in other embodiments, the duct and duct cover may be formed as a single integrally formed piece.

Figure 9:
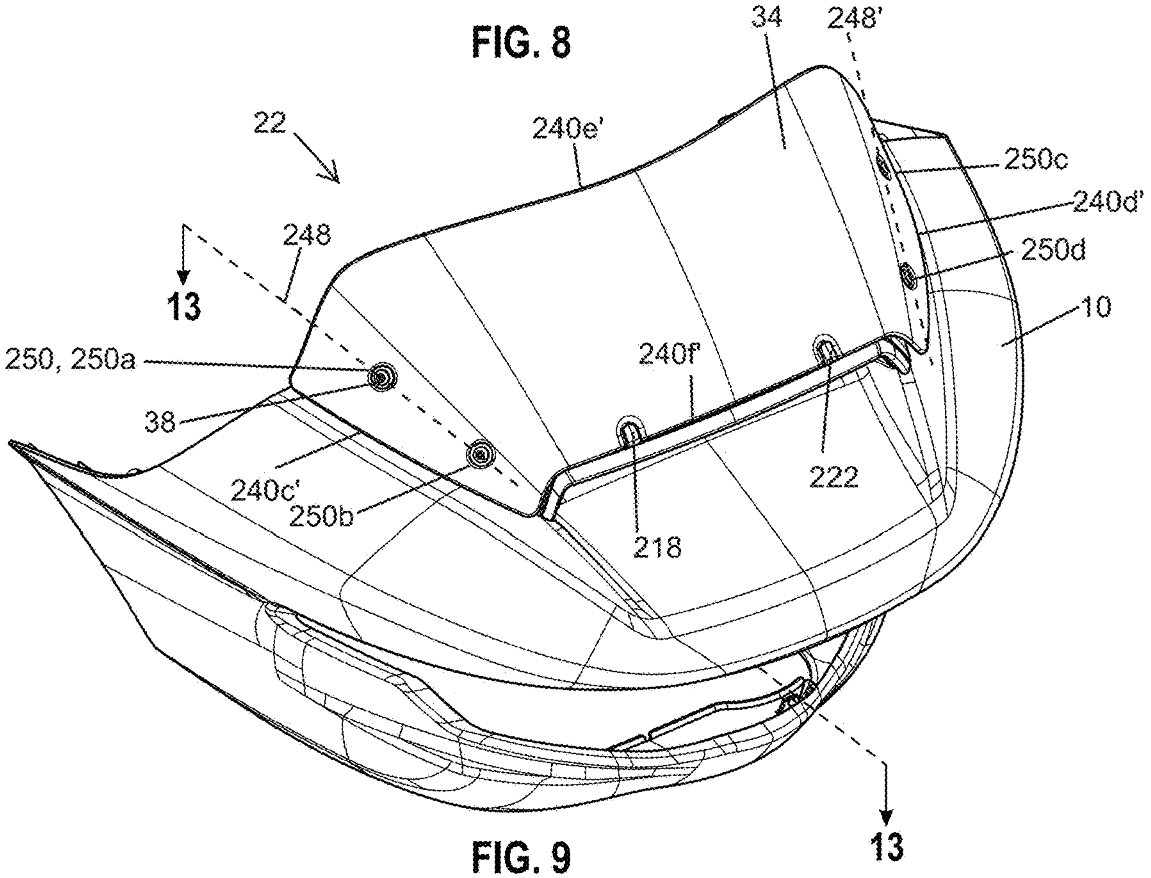
FIG. 9 is a perspective view of an outer fairing for a vehicle including a windshield and duct assembly according to another embodiment.
Figure 10:
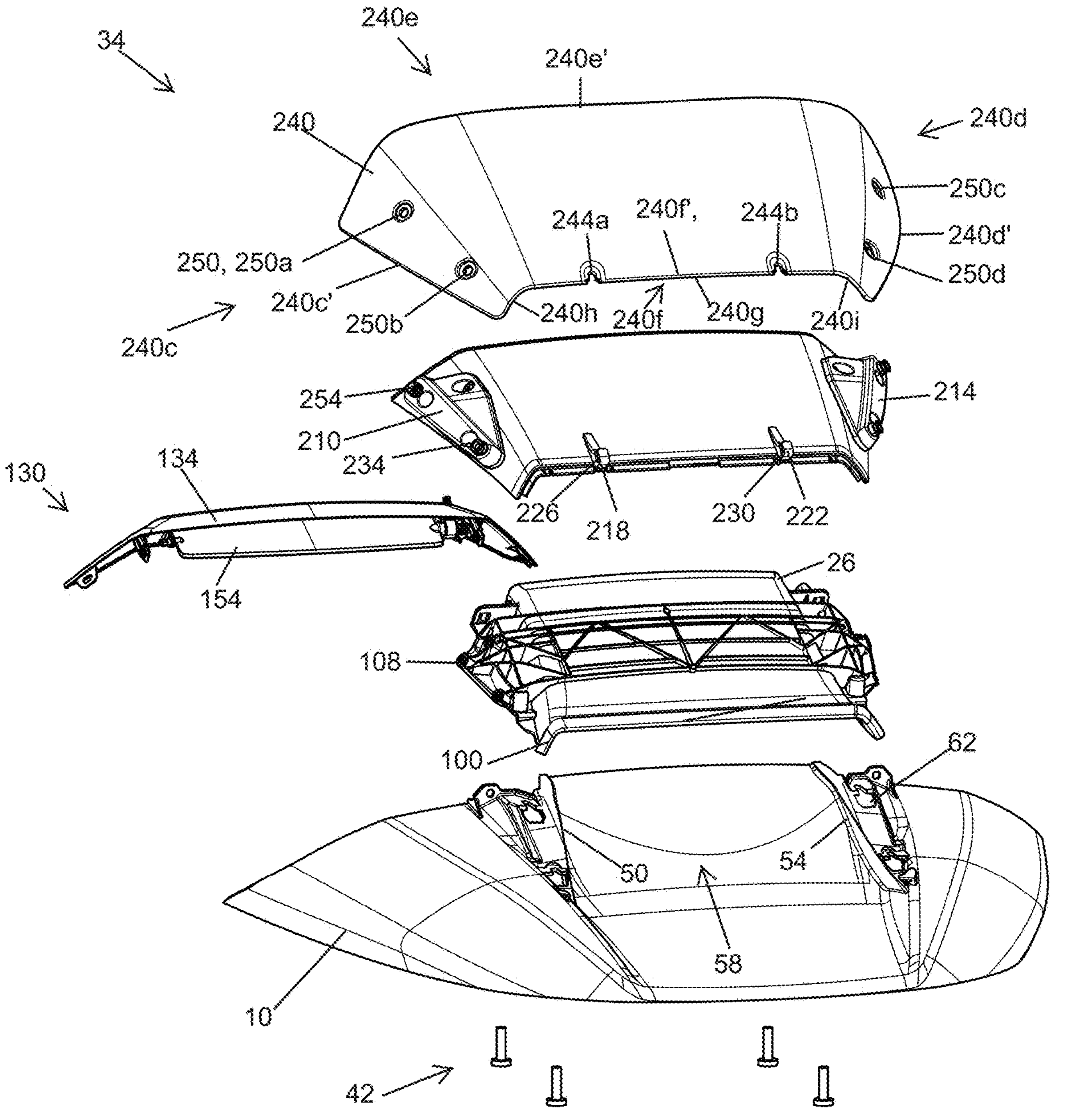
FIG. 10 is an exploded view of the outer fairing and the windshield and duct assembly of FIG. 9.
Figure 11:
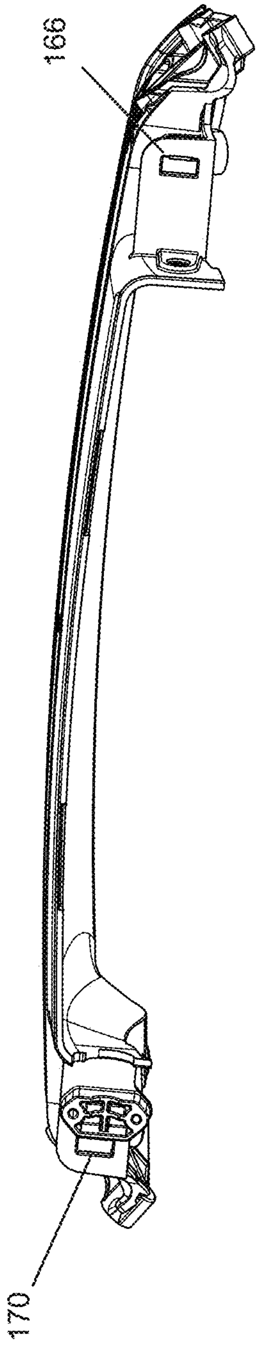
FIG. 11 is an enlarged view of a portion of the windshield and duct assembly of FIG. 9.
Figure 12:
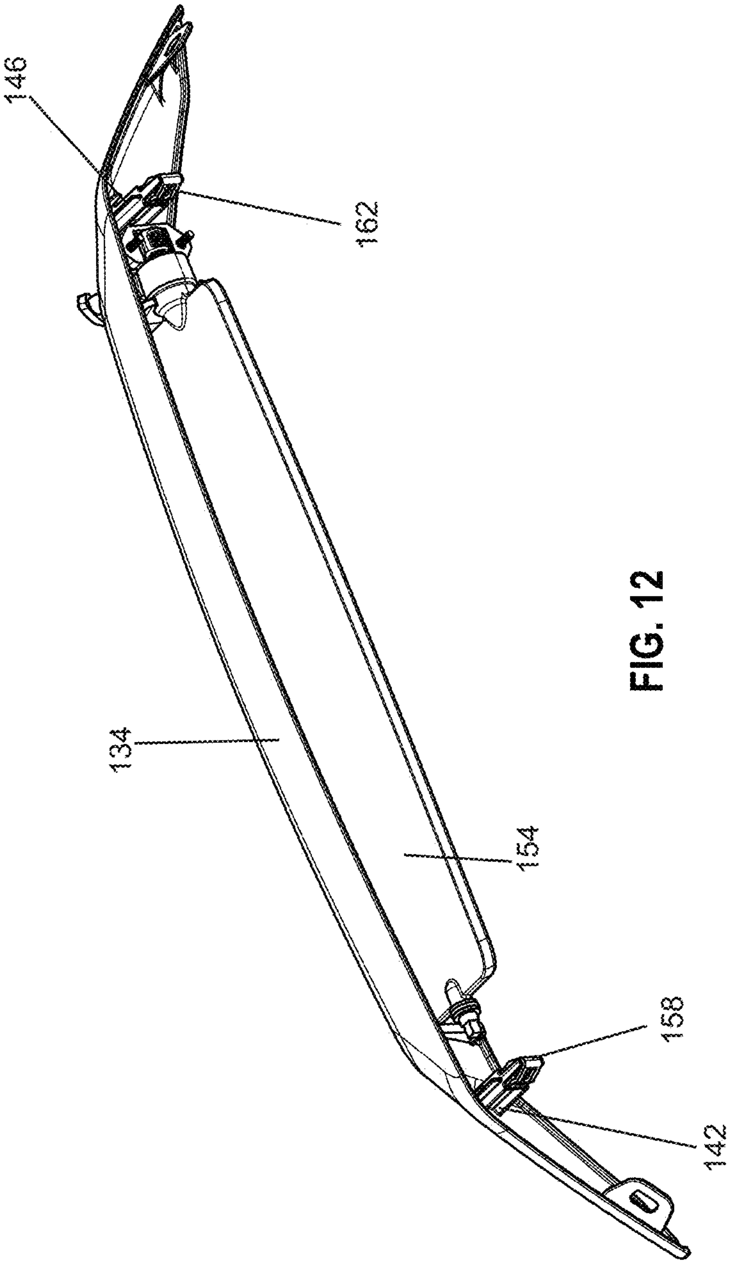
FIG. 12 is an enlarged view of another portion of the windshield and duct assembly of FIG. 9.
Figure 13:
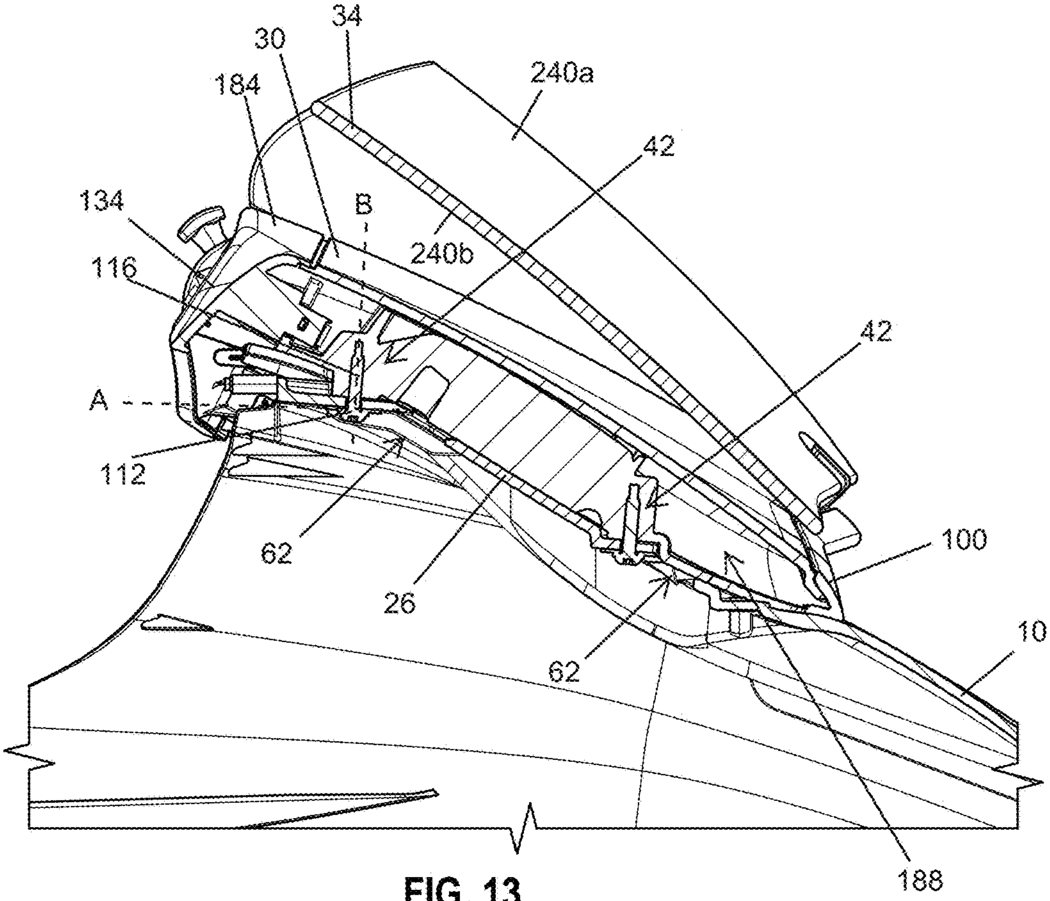
FIG. 13 is a cross-sectional view of the outer fairing and the windshield and duct assembly of FIG. 9 along the line 13-13 of FIG. 9.
Figure 14:
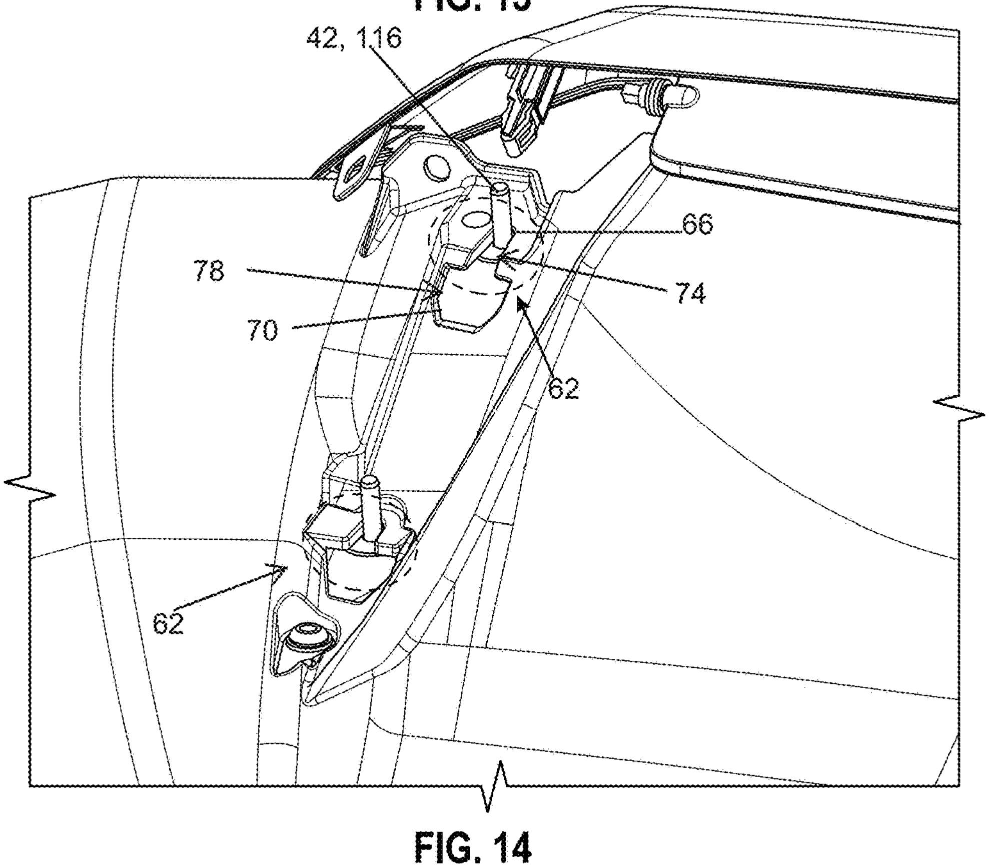
FIG. 14 is a perspective view of the outer fairing of FIG. 9 with a portion of the windshield and duct assembly of FIG. 9 removed.
Figure 15:
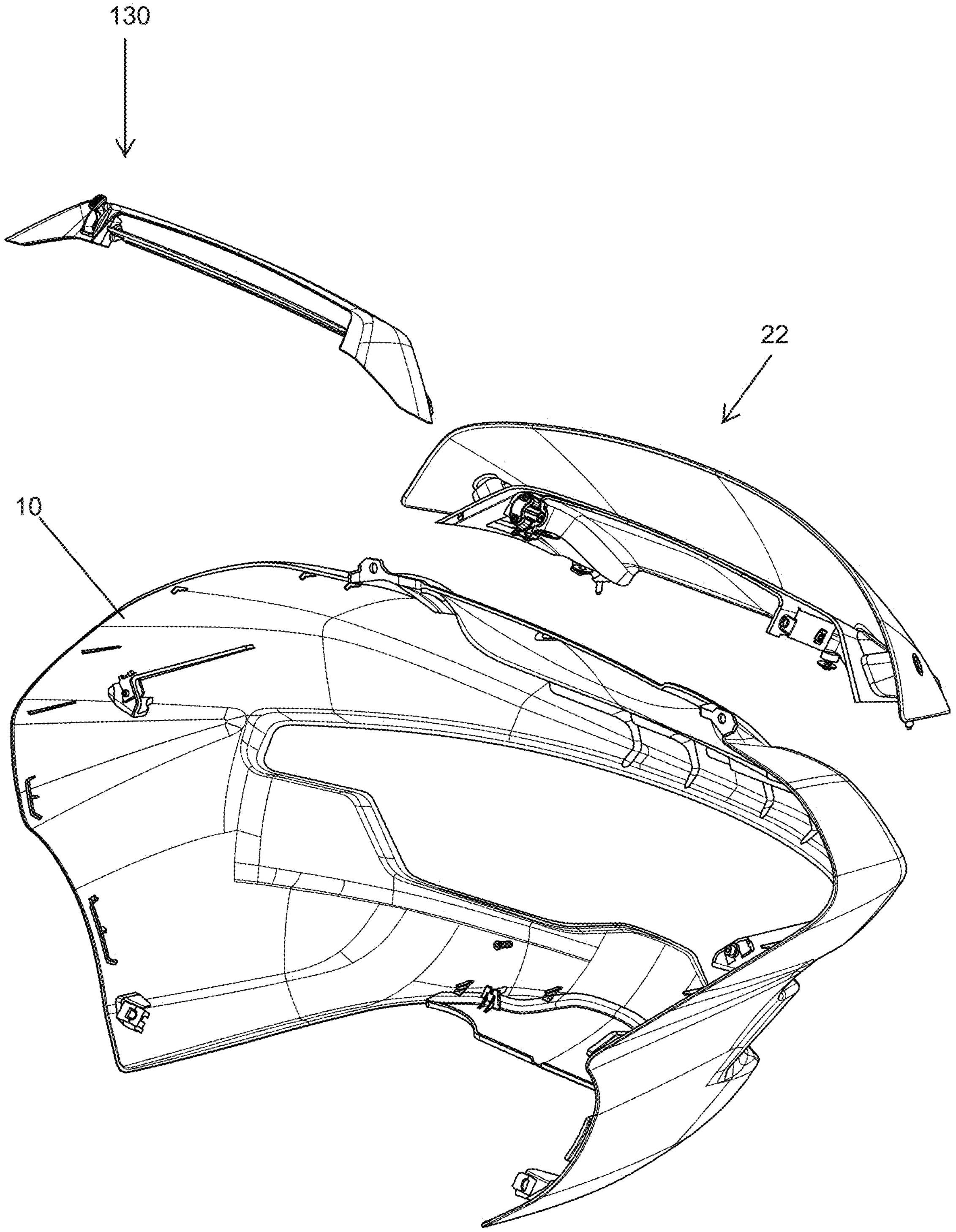
FIG. 15 illustrates the windshield and duct assembly removed from the outer fairing of FIG. 9.

The windshield 34 (FIGS. 3 and 10) is constructed from a tinted or opaque material (e.g., plastic) and is fixedly coupled to the duct cover 30. The windshield 34 includes a body 240 that has an outer surface **240*a*, an inner surface 240*b* (FIGS. 6 and 13) opposite the inner surface, a first side 240*c*, a second side 240*d*, a rear end 240*e*, and a front end 240*f*. The first side 240*c* defines a first side edge 240*c*' and the second side 240*d* defines a second side edge 240*d*'. Similarly, the rear end 240*e* defines a rear edge 240*e*' and the front end 240*f* defines a front edge 240*f*. As shown, the front edge 240*f* extends between the first side edge 240*c*' and the second side edge 240*d*' and the rear edge 240*e*' extends between the first side edge 240*c*' and the second side edge 240*d*'. A distance between the first side edge 240*c*' and the second side edge 240*d*' along the front edge 240*f* is less than a distance between the first side edge 240*c*' and the second side edge 240*d*' along the rear edge 240*e*'. As shown in FIG. 9, the front edge 240*f* may include a central portion 240*g*, a first side portion 240*h*, and a second side portion 240*i*. The central portion 240*g* of the front edge 240*f*' may be raised relative to the first side edge 240*c*' and the second side edge 240*d*'. Also, the first side portion 240*h* may extend from the central portion 240*g* at an obtuse angle, and the second side portion 240*i* may extend from the central portion 240*g* at an obtuse angle. As shown herein, the front edge 240*f* is configured to conform to a contour of the duct cover 30**.

Figure 3:
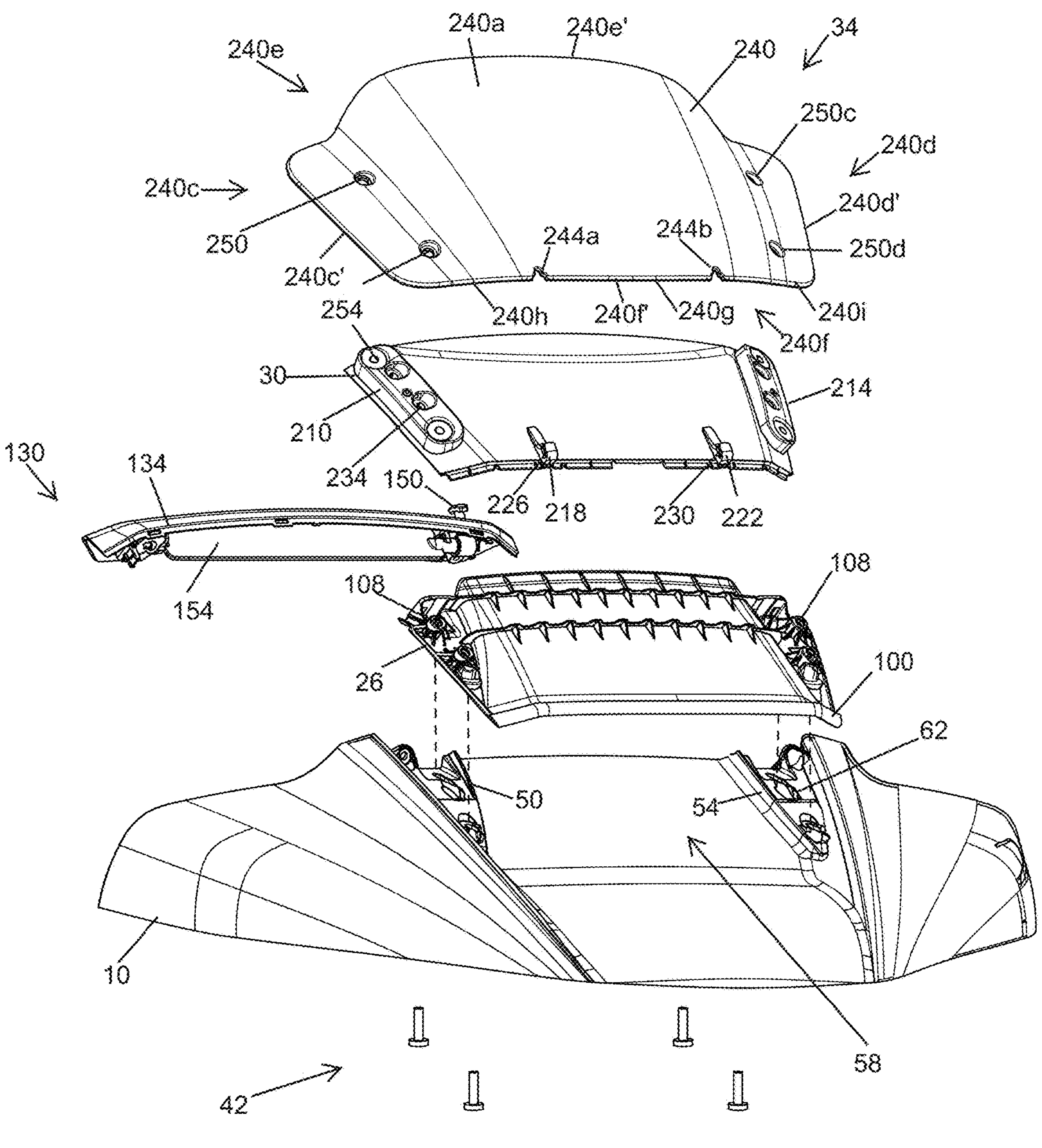
FIG. 3 is an exploded view of the outer fairing and the windshield and duct assembly of FIG. 1.
Figure 4:
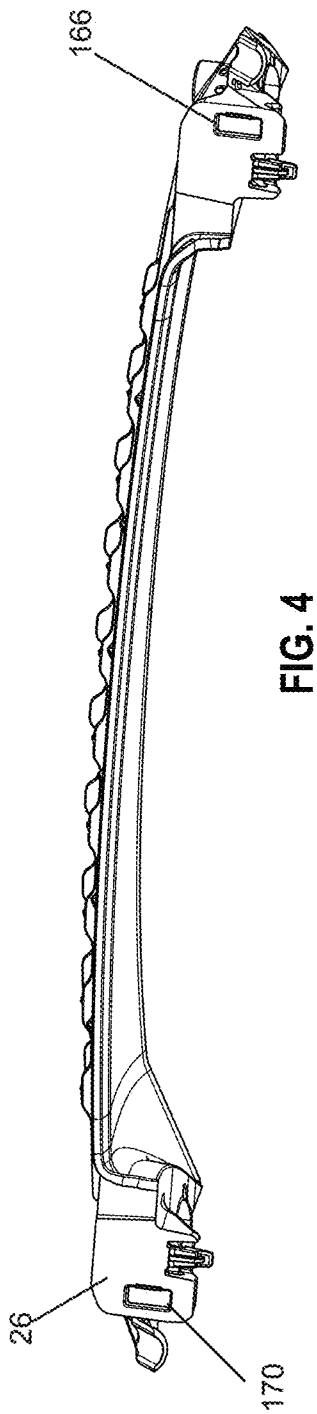
FIG. 4 is an enlarged view of a portion of the windshield and duct assembly of FIG. 1.
Figure 5:
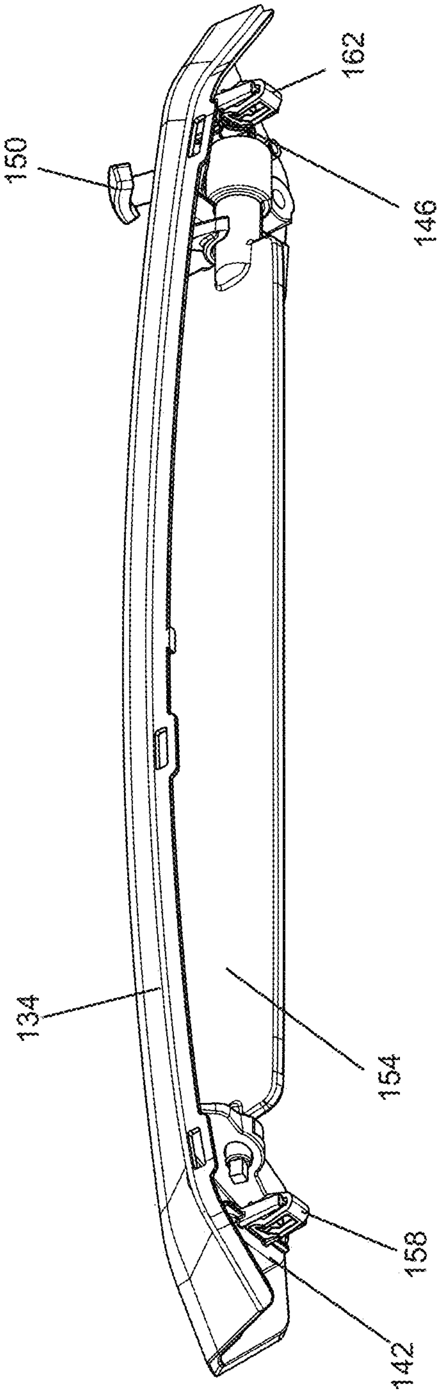
FIG. 5 is an enlarged view of another portion of the windshield and duct assembly of FIG. 1.

The front end **240*f*, and in particular the front edge 240*f*', of the body 240 is received in recesses of the brackets 218, 222. As shown in FIGS. 3 and 9, a pair of notches 244*a*, 244*b* extend from the front edge 240*f* towards the rear edge 240*e*'. Each of the notches 244*a*, 244*b* have an open end at the front edge 240***f* and a closed end spaced apart from the open end. The notches 244*a*, 244*b* are positioned in the central portion 240*g*. The notches 244*a*, 244*b* engage with the brackets 218, 222. In the illustrated embodiment, the windshield 34 (and in particular the notches 244*a*, 244*b*) engages the surfaces of the brackets 218, 222 via a press-fit or an interference fit, although other suitable engagement configurations are possible.

The windshield 34 further includes a plurality of apertures 250 (e.g., mounting holes), each of which aligns with an aperture 254 of a second set of apertures 254 (e.g., mounting holes) of the each of the couplers 210, 214. Accordingly, some of the fasteners 38 extend through each of the apertures 250 in the windshield 34 and the respective aperture 254 in the couplers 210, 214 to fixedly couple the windshield 34 to the duct cover 30, and therefore the duct 26. Together the couplers 210, 214 and the brackets 218, 222, which all project from the outer surface of the duct cover 30, offset the windshield 34 relative to the outer surface of the duct cover 30.

As shown in FIGS. 1-3 and 9-10, the mounting holes 250 may include a first mounting hole 250*a*, a second mounting hole 250*b*, a third mounting hole 250*c*, and a fourth mounting hole 250*d*. The first mounting hole 250*a* is closer to the first side edge 240*c*' than the second side edge 240*d*' and a second mounting hole 250*b* is closer to the first side edge 240*c*' than the second side edge 240*d*'. As shown in FIGS. 1 and 9, the first mounting hole 250*a* and the second mounting hole 250*b* are aligned along a first axis 248 extending between the front edge 240*f*' and the rear edge 240*e*'. The first axis 248 is positioned at a non-parallel angle relative to the first side edge 240*c*'. Similarly, a third mounting hole 250*c* is closer to the second side edge 240*d*' than the first side edge 240*e*', and a fourth mounting hole 250*d* is closer to the second side edge 240*d*' than the first side edge 240*c*'. The third mounting hole 250*c* and the fourth mounting hole 250*d* are aligned along a second axis 248' extending between the front edge 240*f*' and the rear edge 240*e*'. The second axis 248' is positioned at a non-parallel angle relative to the second side edge 240*d*'. The first axis 248 and the second axis 248' converge at a point forward of the front edge 240*f*. In the embodiment illustrated in FIGS. 1-3, the first, second, third, and fourth mounting holes 250*a*, 250*b*, 250*c*, 250*d* are positioned on a top surface of the windshield 34 and face upwardly. In the embodiment illustrated in FIGS. 9-10, the first, second, third, and fourth mounting holes 250*a*, 250*b*, 250*c*, 250*d* are positioned on curved side surfaces of the windshield 34 and face outwardly.

Figure 6:
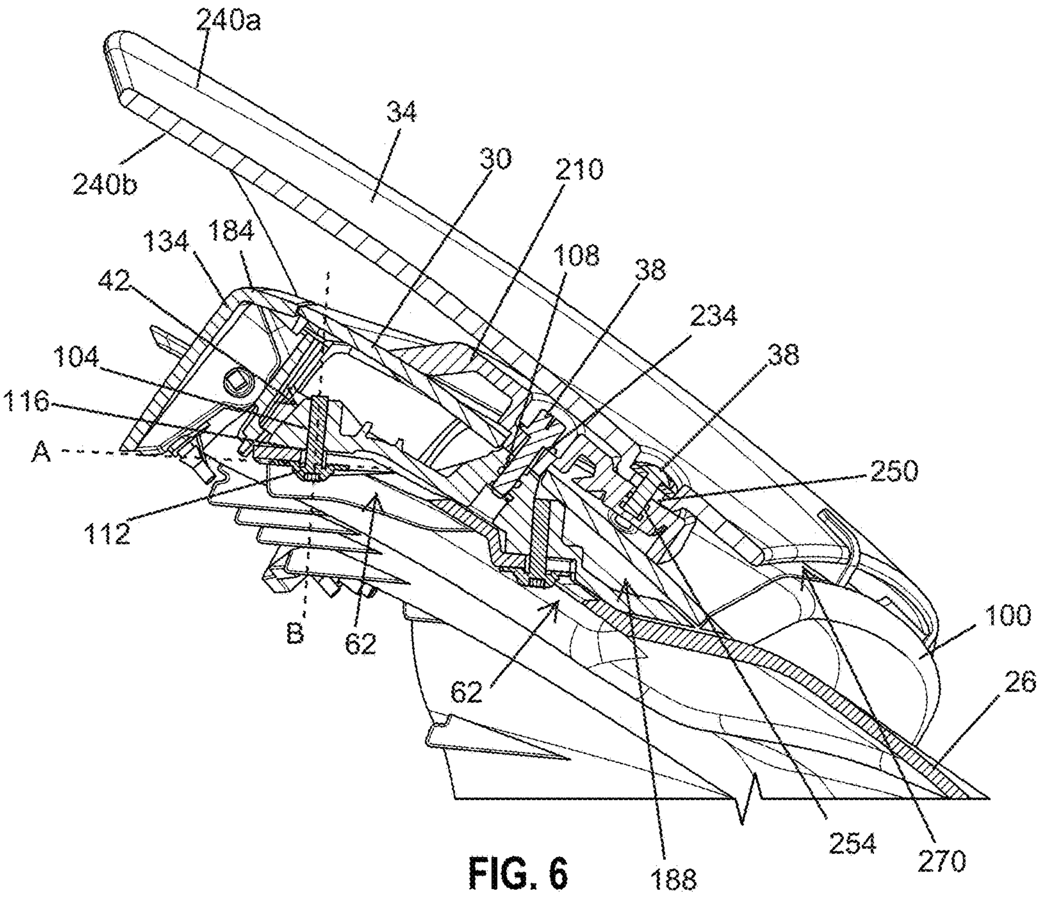
FIG. 6 is a cross-sectional view of the outer fairing and the windshield and duct assembly of FIG. 1 along the line 6-6 of FIG. 1.
Figure 7:
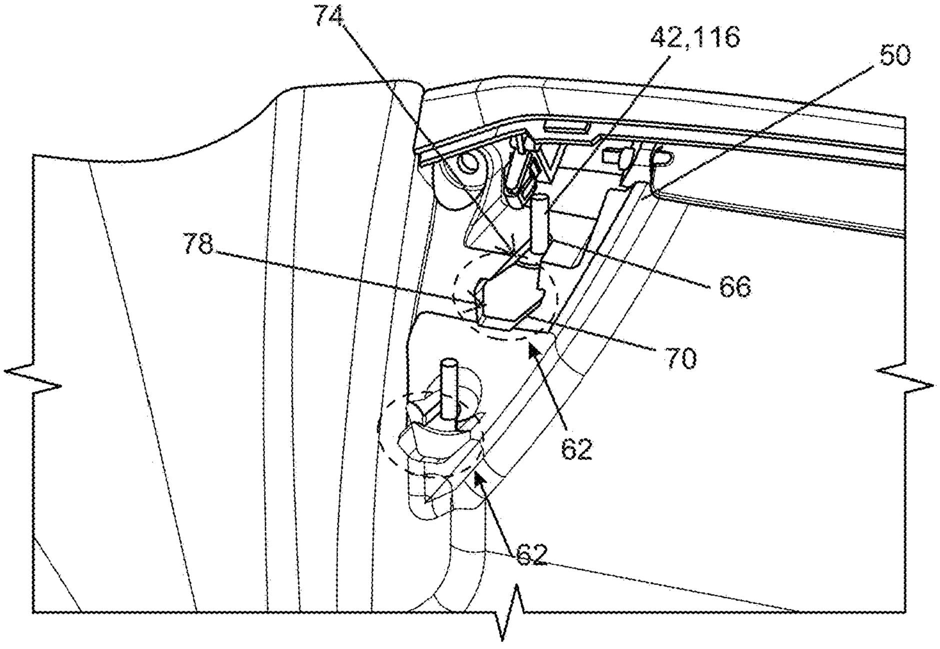
FIG. 7 is a perspective view of the outer fairing of FIG. 1 with a portion of the windshield and duct assembly of FIG. 1 removed.
Figure 8:
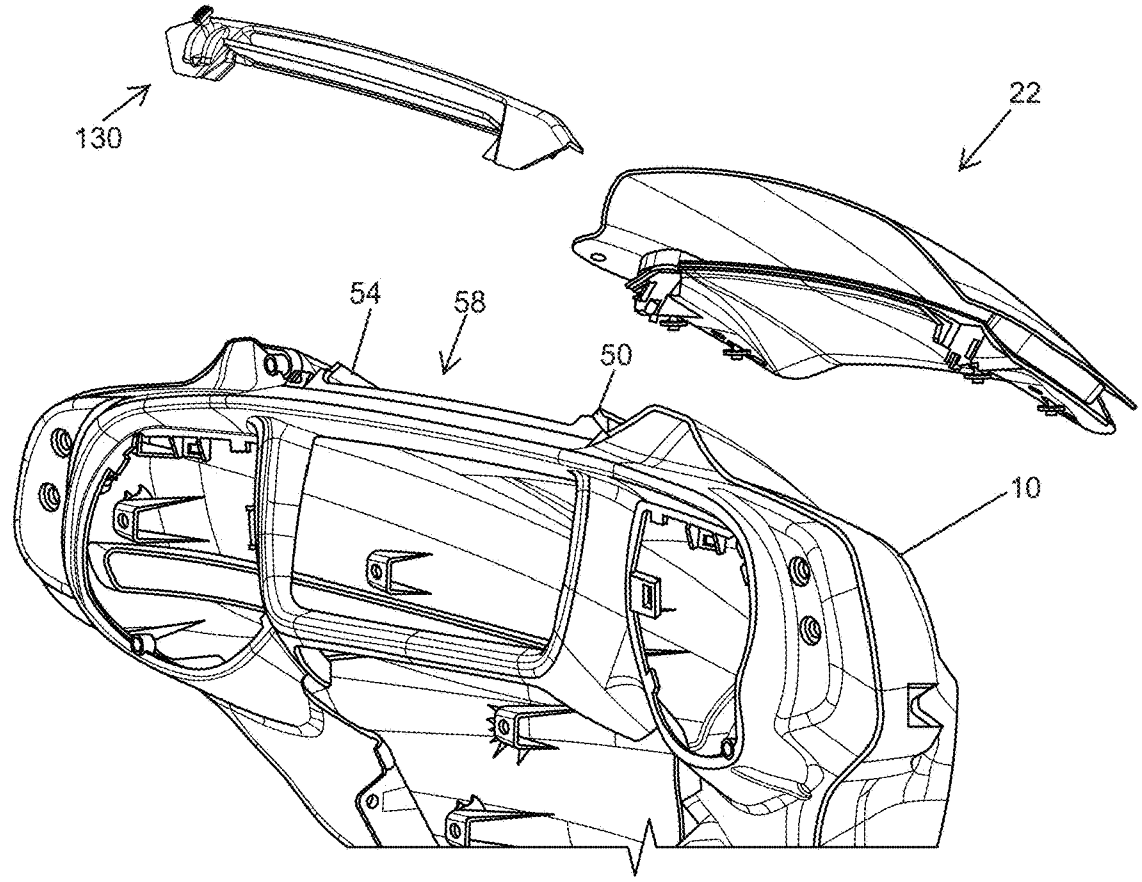
FIG. 8 illustrates the windshield and duct assembly removed from the outer fairing of FIG. 1.

As shown in FIG. 6, a gap 270 is created between the outer surface of the duct cover 30 and an inner surface 240*b* of the windshield 34. During normal operation, wind, often at high velocities, moves through the gap 270, which can cause aerostructural resonance between the windshield 34 and the duct cover 30. The brackets 218, 222 that receive the front end of the windshield 34 anchor or otherwise constrain the windshield 34 relative to the duct cover 30, and therefore the outer fairing 10. The brackets 218, 222 therefore reduce the amount of resonance therebetween, which in turn reduces oscillation therebetween, as well as the possibility of fracture of the windshield 34. In other words, the brackets 218, 222 are shock absorbers that reduce and dampen the movement between the windshield 34 and the duct cover 30 during normal operation.

Figure 18:
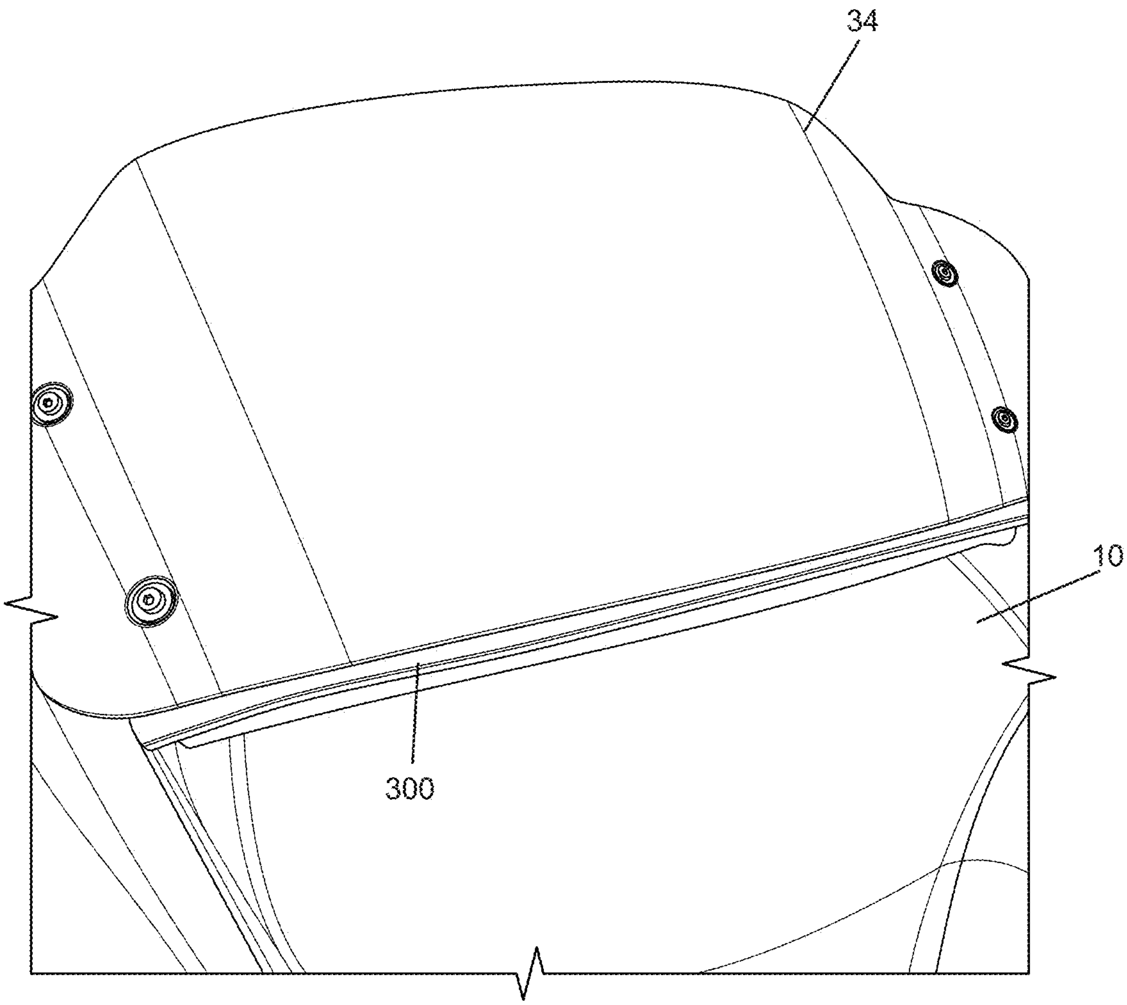
FIG. 18 illustrates a windshield and duct assembly for use with the outer fairing of FIGS. 1-8 or FIGS. 9-17 according to another embodiment.
Figure 19:
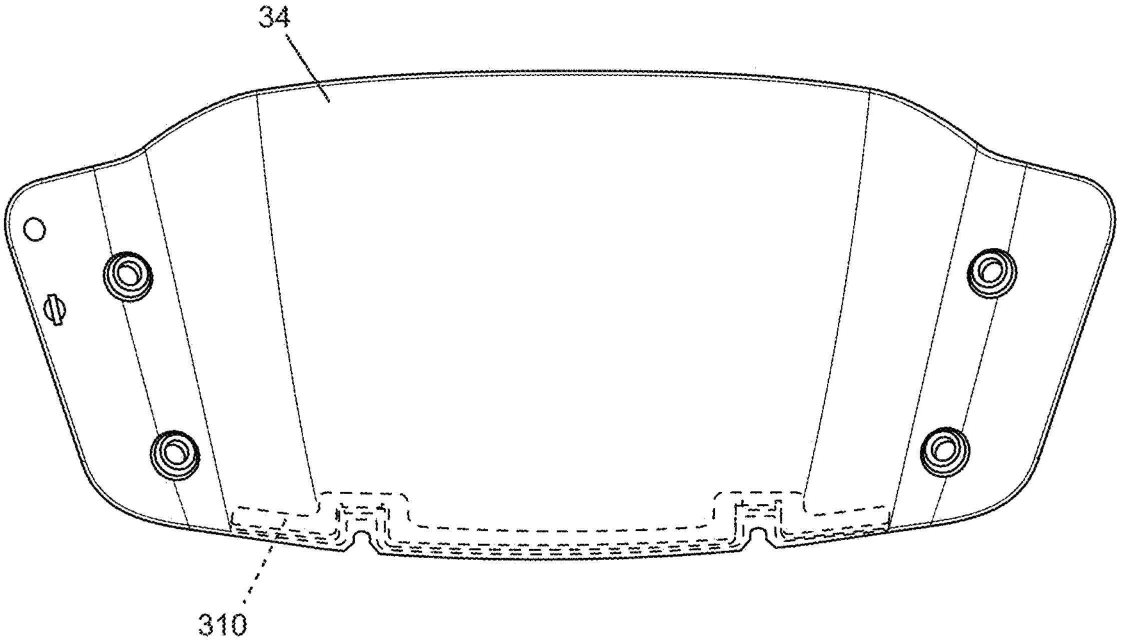
FIG. 19 illustrates a portion of a windshield and duct assembly for use with the outer fairing of FIGS. 1-8 or FIGS. 9-17 according to another embodiment.
Figure 20:
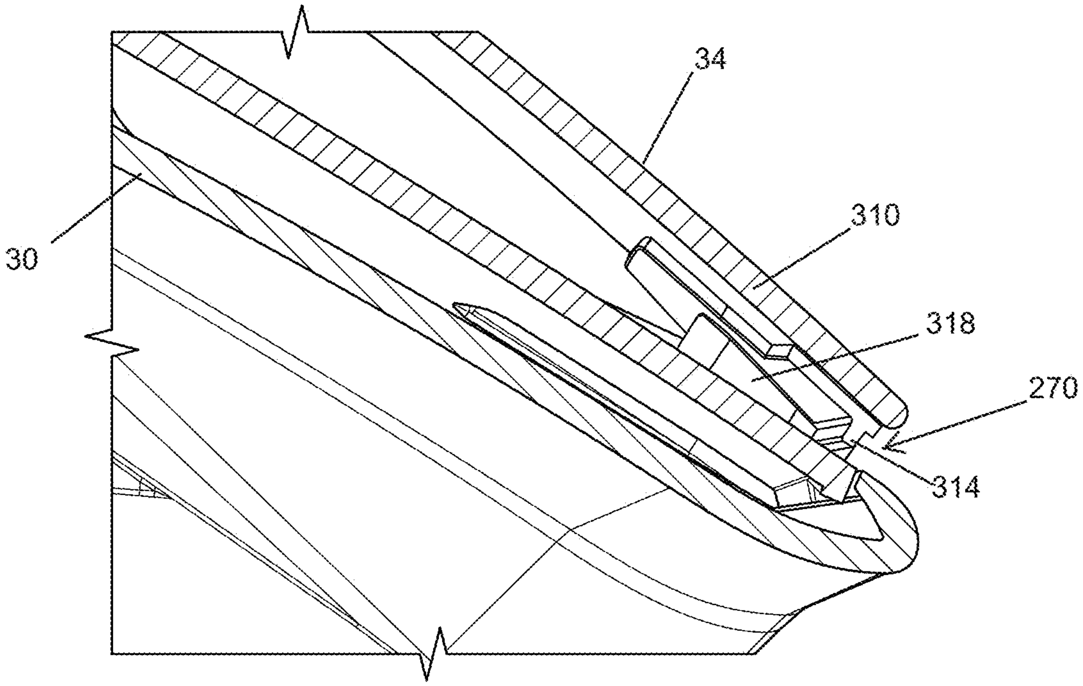
FIG. 20 illustrates a cross-sectional view of the portion of the windshield and duct assembly of FIG. 19.

As shown in FIGS. 18-20, the shock absorber may have other configurations than the brackets 218, 222 shown in FIGS. 1-15. It should be understood that the shock absorbers 18-20 are suitable for either of the vehicles shown in FIGS. 1-8 or FIGS. 9-15. For example, in the embodiment of FIG. 18 the brackets 218, 222 are replaced with an elongate gasket 300. As shown, the elongate gasket 300 is positioned between the front end of the windshield 34 and the duct cover 30. The elongate gasket 300 is positioned between the inner surface of the windshield 34 and the duct cover 30. In the illustrated embodiment, the elongated gasket 300 is long enough to cover substantially the entire gap 270. That is, the elongate gasket 310 extends generally the entire width of the front end of the windshield 34. In other embodiments, the elongate gasket 300 may be shorter or any suitable length.

Another example is shown in FIGS. 19-20, which show another elongate gasket 310. In the illustrated embodiment, the elongated gasket 310 is molded as a single piece with the windshield 34. The elongate gasket 310 includes a body with a lip 314 and one or more supports 318 extending therefrom. Each of the supports 318 includes an inner surface that is configured to be positioned adjacent to the outer surface of the duct cover 30. In some embodiments, the inner surfaces of the supports 318 are configured to contact the outer surface of the duct cover 30. In some embodiments, the inner surfaces of the supports 318 are configured to be adhered (e.g., via adhesive or other suitable means) to the outer surface of the duct cover 30. In other embodiments, the elongated gasket 310 may be a separate piece coupled to the windshield 34. In such case, an outer surface of the body is adhered (e.g., via adhesive or other suitable means) to the inner surface of the windshield 34. The elongate gasket 310 extends generally the entire width of the front end of the windshield 34. In other embodiments, the elongate gasket 310 may be shorter or have another suitable length. As shown, the supports 318 take up space between the inner surface of the windshield 34 and the outer surface of the duct cover 30. Also, the lip 314 reduces the size of the gap 270. The gasket 310 is therefore configured to reduce the amount of airflow velocity and thus movement between the windshield 34 and the duct cover 30.

The elongate gaskets 300, 310 may be formed from any suitable material, such as, but not limited to, plastic, metal, felt foam, rubber, nylon, vinyl, silicone, and/or a combination of one or more of these and/or other materials. Finally, either of the gaskets 300, 310 may be used in combination with the brackets 218, 222.

When the predetermined deceleration is experienced by the vehicle 18, the windshield and duct assembly 22 may release because, collectively, the fasteners 42 move (e.g., slide along the axis A) through the respective open-ended aperture 62 from the closed end 66 through the open end 70. Accordingly, rather than the fasteners 42 breaking or otherwise deforming, the duct 26 (and therefore the windshield and duct assembly 22) moves with the fasteners to which they it coupled. Because the duct 26 is fixedly coupled to the duct cover 30 and the windshield 34, the duct cover 30 and the windshield 34 move with the duct 26. As noted above, the duct vane assembly 130 is removably coupled to the duct 26. Therefore, the duct vane assembly 130 may release with the duct 26 initially, but it may separate from the duct 26 thereafter. Alternatively, the duct vane assembly 130 may release separate from the duct 26 initially. In either case, the windshield and duct assembly 22 (and each component thereof, e.g., the duct 26, the duct vane assembly 130, the duct cover 30, and the windshield 34) are removed from in front of the rider.

Figure 16:
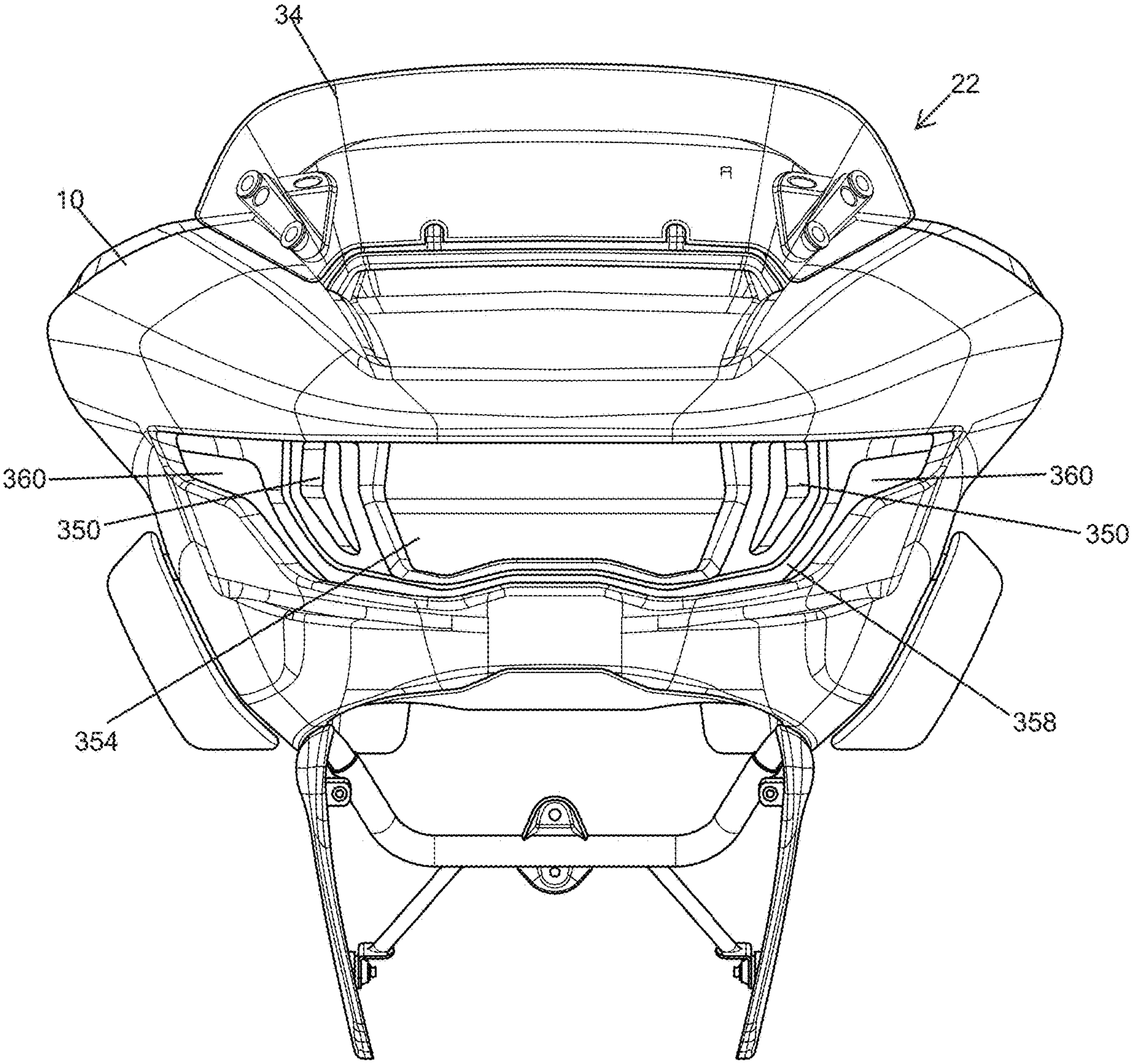
FIG. 16 illustrates a front view of the outer fairing and the windshield and duct assembly of FIG. 9 and further includes a light assembly.
Figure 17:
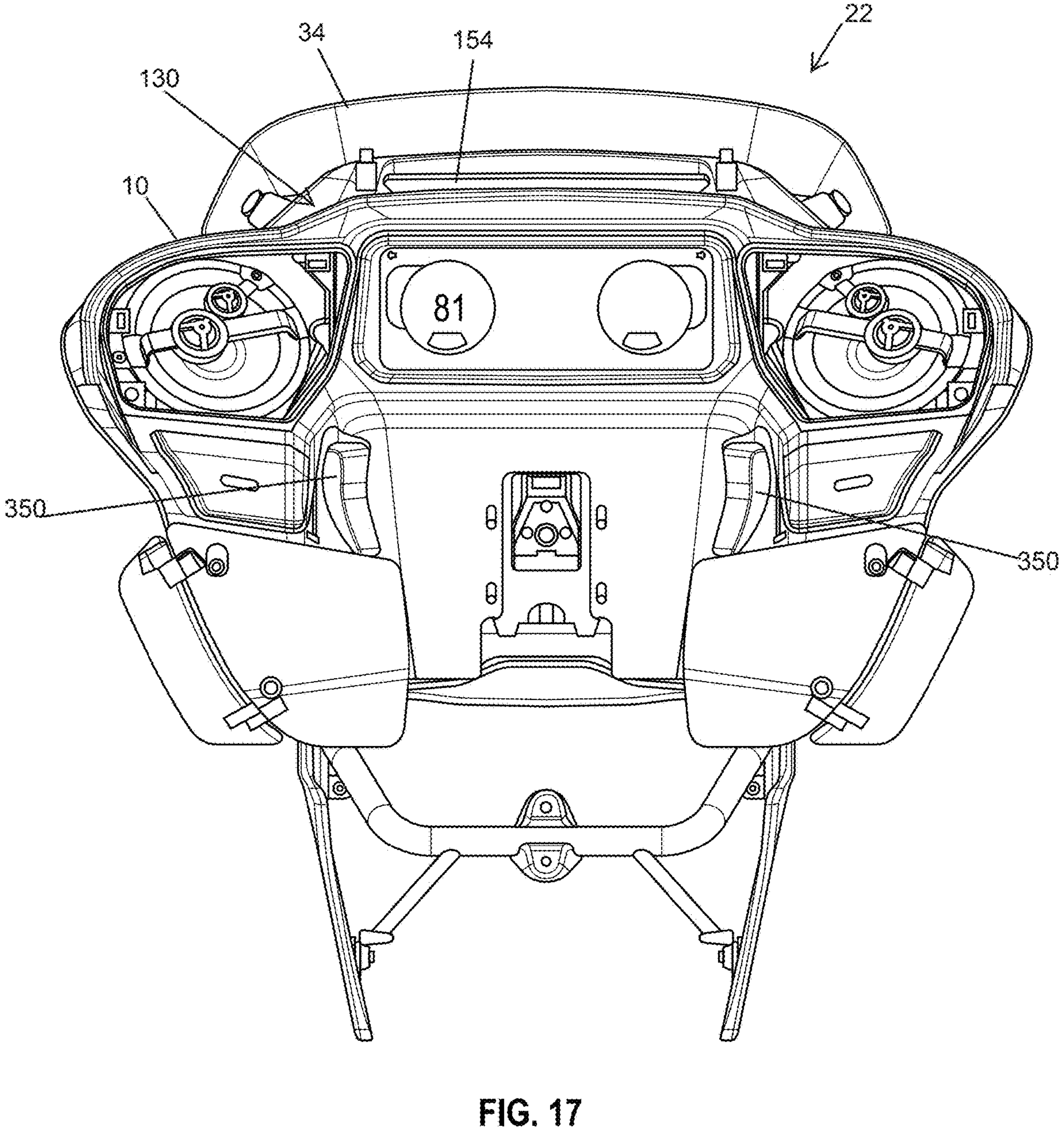
FIG. 17 illustrates a rear view of the outer fairing, the windshield and duct assembly, and the light assembly of FIG. 9.

Other ways of routing wind through the fairing and/or the windshield and duct assembly 22 are discussed below relative to FIGS. 16-17 and 21.

Figure 21:
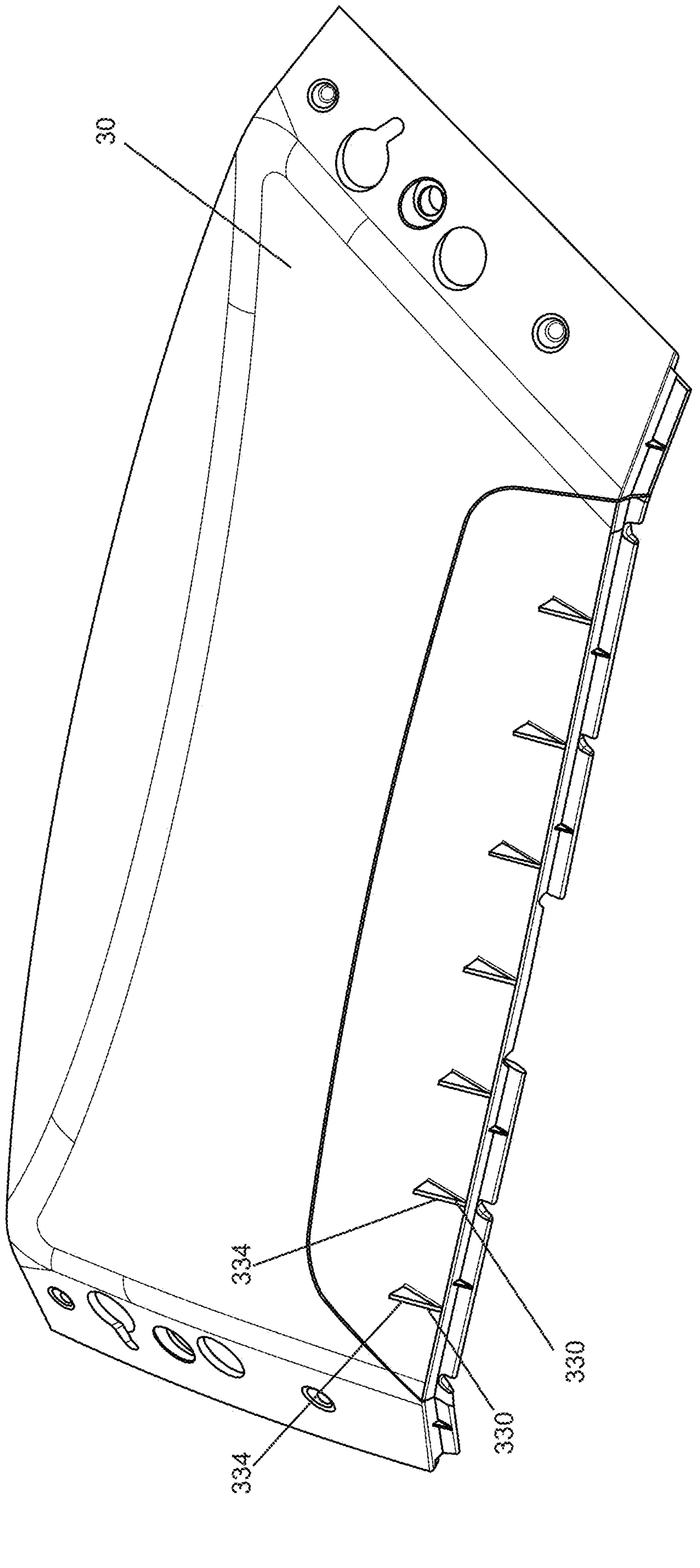
FIG. 21 illustrates a portion of a windshield and duct assembly for use with the outer fairing of FIGS. 1-8 or FIGS. 9-17 according to another embodiment.

Beyond the use of shock absorbers, another method of reducing resonance, and therefore, movement between the windshield 34 and the duct cover 30 is shown in FIG. 21. There, the duct cover 30 has a plurality of projections 330 (e.g., polygonal projections) extending from the outer surface adjacent to the front end. In the illustrated embodiment, the projections 330 are each triangular, although other shapes are possible. Each of the polygonal projections 330 has an inclined surface 334. A height defined between the inclined surface 334 and the outer surface of the duct cover 30 decreases in a direction from the rear end to the front end. When assembled, at least a portion of each of the inclined surfaces 334 is configured to be positioned adjacent to the inner surface of the windshield 34. The polygonal projections 330 break up the wind, and therefore the resonance, moving through the gap 270.

It is also noted that wind can be routed through the outer fairing 10 in some cases. As shown in FIGS. 16-17, the outer fairing 10 may include additional ducts 350 that extend from a front end of the fairing rearwardly to an area where the passenger is seated. In the illustrated embodiment, the ducts 350 are positioned on opposite sides of a headlight unit 354. The headlight unit 354 and the ducts 350 are incorporated within a combination light assembly that includes high and low beams, position light(s) 358, and turn signals 360. The ducts 350 route cooling airflow through the front lighting aperture of the outer fairing 10 to the passenger.

Various features and advantages of the invention are set forth in the following claims.

What is claimed is:

1. A windshield removably couplable to a panel of a vehicle, the windshield comprising:
- an outer surface;
- an inner surface opposite the outer surface;
- a first side edge;
- a second side edge;
- a front edge extending between the first side edge and the second side edge, a central portion of the front edge being raised relative to the first side edge and the second side edge;
- a rear edge extending between the first side edge and the second side edge;
- a notch extending from the front edge towards the rear edge, the notch having an open end at the front edge and a closed end spaced apart from the open end;
- a first mounting hole closer to the first side edge than the second side edge; and
- a second mounting hole closer to the second side edge than the first side edge,
- wherein the front edge is configured to conform to a contour of the panel,
- wherein the notch is configured to engage with a bracket that extends from the panel, and
- wherein each of the first mounting hole and second mounting hole is configured to receive a fastener to secure the windshield to the panel.

2. The windshield of claim 1, wherein the notch is a first notch, and further comprising a second notch extending from the front edge towards the rear edge, the second notch having an open end at the front edge and a closed end spaced apart from the open end, the second notch configured to engage with another bracket that extends from the panel.

3. The windshield of claim 2, wherein the first notch and the second notch are positioned in the central portion.

4. The windshield of claim 1, wherein the notch is positioned in the central portion.

5. The windshield of claim 1, further comprising a third mounting hole closer to the first side edge than the second side edge, the first mounting hole and the third mounting hole aligned along a first axis that extends between the front edge and the rear edge, and further comprising a fourth mounting hole closer to the second side edge than the first side edge, the second mounting hole and the fourth mounting hole aligned along a second axis that extends between the front edge and the rear edge.

6. The windshield of claim 5, wherein the first axis is positioned at a non-parallel angle relative to the first side edge and the second axis is positioned at a non-parallel angle relative to the second side edge.

7. The windshield of claim 5, wherein the first axis and the second axis converge at a point forward of the front edge.

8. The windshield of claim 1, wherein a distance between the first side edge and the second side edge along the front edge is less than a distance between the first side edge and the second side edge along the rear edge.

9. The windshield of claim 1, wherein the first and second mounting holes face upwardly.

10. The windshield of claim 1, wherein the first and second mounting holes face outwardly.

11. The windshield of claim 7, further comprising a top surface, wherein the first, second, third, and fourth mounting holes are positioned on the top surface and face upwardly.

12. The windshield of claim 7, further comprising curved side surfaces, wherein the first, second, third, and fourth mounting holes are positioned on the curved side surfaces and face outwardly.

13. A windshield removably couplable to a panel of a vehicle, the windshield comprising:
- an outer surface;
- an inner surface opposite the outer surface;
- a front edge having a central portion, a first side portion extending from the central portion at an obtuse angle, and a second side portion extending from the central portion at an obtuse angle;
- a rear edge opposite the front edge;
- a first side edge extending between the front edge and the rear edge;
- a second side edge between the front edge and the rear edge;
- a notch extending from the front edge towards the rear edge, the notch having an open end at the front edge and a closed end spaced apart from the open end;
- a first mounting hole closer to the first side edge than the second side edge; and
- a second mounting hole closer to the second side edge than the first side edge,
- wherein the notch is configured to engage with a bracket that extends from the panel, and
- wherein each of the first mounting hole and second mounting hole is configured to receive a fastener to secure the windshield to the panel.

14. The windshield of claim 13, wherein the notch is a first notch, and further comprising a second notch extending between the outer surface and the inner surface and extending from the front edge towards the rear edge, the second notch having an open end at the front edge and a closed end spaced apart from the open end, the second notch configured to engage with a recess of another bracket that extends from the panel.

15. The windshield of claim 14, wherein the first notch and the second notch are positioned in the central portion of the front edge.

16. The windshield of claim 13, wherein the notch is positioned in the central portion of the front edge.

17. The windshield of claim 13, further comprising a third mounting hole closer to the first side edge than the second side edge, the first mounting hole and the third mounting hole aligned along a first axis that extends between the front edge and the rear edge, and wherein a fourth mounting hole closer to the second side edge than the first side edge, the second mounting hole and the fourth mounting hole aligned along a second axis that extends between the front edge and the rear edge.

18. The windshield of claim 17, wherein the first axis is positioned at a non-parallel angle relative to the first side edge and the second axis is positioned at a non-parallel angle relative to the second side edge.

19. The windshield of claim 18, wherein a distance between the first side edge and the second side edge along the front edge is less than a distance between the first side edge and the second side edge along the rear edge.

20. The windshield of claim 17, wherein the first axis and the second axis converge at a point forward of the front edge.

21. The windshield of claim 13, wherein the first and second mounting holes face upwardly.

22. The windshield of claim 13, wherein the first and second mounting holes face outwardly.

23. The windshield of claim 20, further comprising a top surface, wherein the first, second, third, and fourth mounting holes are positioned on the top surface and face upwardly.

24. The windshield of claim 20, further comprising curved side surfaces, wherein the first, second, third, and fourth mounting holes are positioned on the curved side surfaces and face outwardly.

25. A windshield removably couplable to a panel of a vehicle, the windshield comprising:

an outer surface;

an inner surface opposite the outer surface;

a front edge;

a rear edge opposite the front edge;

a first side edge extending between the front edge and the rear edge;

a second side edge extending between the front edge and the rear edge;

a first notch extending from the front edge towards the rear edge, the first notch having an open end at the front edge and a closed end spaced apart from the open end;

a second notch extending from the front edge towards the rear edge, the second notch having an open end at the front edge and a closed end spaced apart from the open end;

a first mounting hole closer to the first side edge than the second side edge;

a second mounting hole closer to the first side edge than the second side edge, the first mounting hole and the second mounting hole aligned along a first axis extending between the front edge and the rear edge, the first axis being positioned at a non-parallel angle relative to the first side edge;

a third mounting hole closer to the second side edge than the first side edge; and a fourth mounting hole closer to the second side edge than the first side edge, the third mounting hole and the fourth mounting hole aligned along a second axis extending between the front edge and the rear edge, the second axis being positioned at a non-parallel angle relative to the second side edge, wherein the first notch is configured to engage with a first bracket that extends from the panel, and the second notch is configured to engage with a recess of a second bracket that extends from the panel, wherein each of the first mounting hole, the second mounting hole, the third mounting hole, and the fourth mounting hole is configured to receive a fastener to secure the windshield to the panel.

26. The windshield of claim 25, wherein the first mounting hole and the second mounting hole are positioned closer to the first side edge than the first notch, and wherein the third mounting hole and the fourth mounting hole are positioned closer to the second side edge than the second notch.

27. The windshield of claim 26, wherein the first axis and the second axis converge at a point forward of the front edge.

28. The windshield of claim 25, wherein a distance between the first side edge and the second side edge along the front edge is less than a distance between the first side edge and the second side edge along the rear edge.

29. The windshield of claim 25, wherein the first, second, third, and fourth mounting holes face upwardly.

30. The windshield of claim 25, wherein the first, second, third, and fourth mounting holes face outwardly.

31. The windshield of claim 27, further comprising a top surface, wherein the first, second, third, and fourth mounting holes are positioned on the top surface and face upwardly.

32. The windshield of claim 27, further comprising curved side surfaces, wherein the first, second, third, and fourth mounting holes are positioned on the curved side surfaces and face outwardly.

* * * * *